Figure 1:
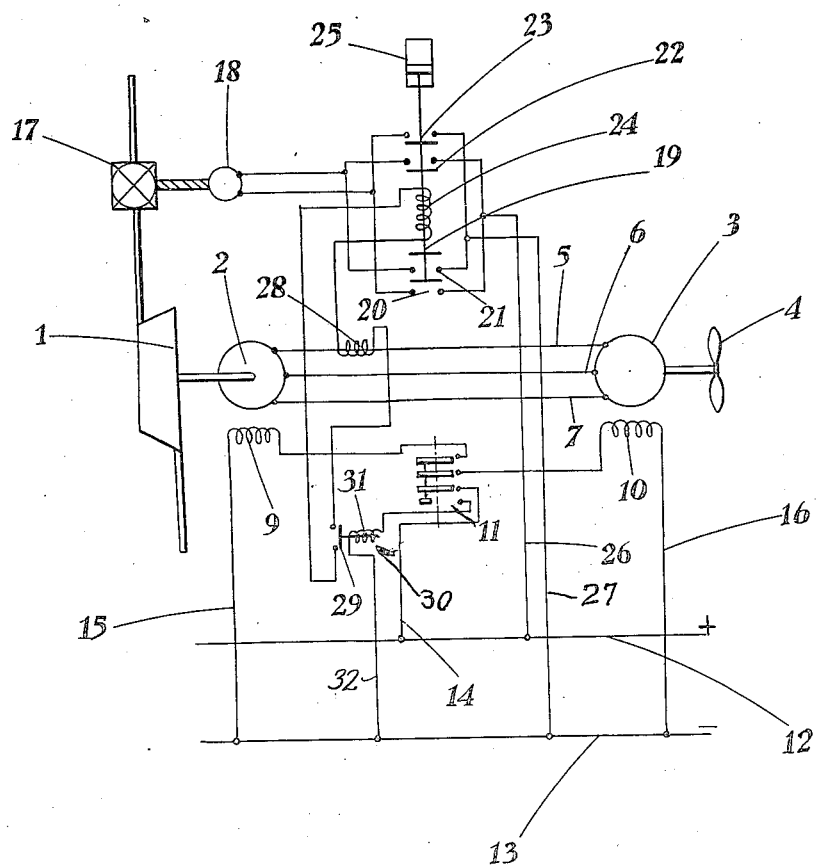

Sept. 15, 1936.  C. W. SAUNDERS  2,054,662

ELECTRIC POWER PLANT

Filed Jan. 3, 1935

INVENTOR
Charles W. Saunders
BY M. H. Lockwood
ATTORNEY

Patented Sept. 15, 1936

2,054,662

UNITED STATES PATENT OFFICE 2,054,662

ELECTRIC POWER PLANT

Charles Wallace Saunders, Bramley, England, assignor to The General Electric Company Limited, London, England Application January 3, 1935, Serial No. 197
In Great Britain March 7, 1934

5 Claims. (Cl. 290—17)

This invention relates to protective arrangements for electric power plant of the kind comprising a prime mover and a dynamo-electric generator adapted to supply power to an electric motor and more particularly to protective arrangements for power plant for ship propulsion. In such plant the motor or motors may be controlled in various ways. For example, the field strength of the generator or generators or motor or motors may be varied or the speed of the prime mover associated with each generator may be adjusted or both the field strength and prime mover speed may be regulated.

In the operation of plants of the kind in question not only is there danger of the motor or motors being overloaded but also the generators and prime movers may become overloaded and an object of this invention is the provision of convenient, simple and robust means for protecting the prime movers and the electrical parts of power plants.

A further object of the invention is to provide in an electric ship propulsion system improved means for avoiding danger to the electrical plant due to undesirably large currents such as may flow, for example when an inboard propeller experiences increased resistance through operation of the helm or when the rating of a motor or motors and the rating of a generator connected therewith differ substantially.

According to the present invention, an electric power plant such as an electric ship propulsion system comprises a relay arranged to be influenced by the power flow in a main power circuit and adapted to operate at a predetermined value of current to limit the input of motive fluid to a prime mover driving a generator associated with said main power circuit to limit the power output of the said generator.

Thus in an electric ship propulsion system with speed control by variation of the speed of a turbine driven alternating current generator, a relay may be provided which may be arranged to be influenced by the current flow in a main power circuit and to operate at a predetermined value of current to effect a limitation of the input of motive fluid to the turbine to limit the current output of the alternating current generator driven by that turbine.

In such an arrangement it may be arranged that the said relay is rendered ineffective or has its setting raised during reversing or starting operations. Thus where a control device is provided which controls the synchronization of a motor upon starting or reversal thereof and the speed of the motor after synchronization thereof, an interlock may be provided between the said device and the relay whereby the latter is ineffective while synchronization is taking place.

An arrangement in accordance with the invention will now be described by way of example with reference to the accompanying diagrammatic drawing, which shows an arrangement of alternating current generator, driven by a turbine and feeding an alternating current motor in which the desired overload protection for the generator is effected by the control of the steam input to the turbine.

In the drawing, a steam turbine 1 drives a three phase alternating current generator 2 which supplies an alternating current motor 3, driving the screw 4, over three phase bus-bars 5, 6, 7, under the control of any suitable control means. The excitations of the alternator field 9 and the motor field 10 are controlled by suitable control means 11 by which the current flow from auxiliary supply bus bars 12 and 13 over a common line 14 and lines 15, 16 may be controlled.

In addition to the usual variable governor valves operating to control the steam flow to the turbine (not shown), a further motor driven throttle valve 17 is provided which is arranged to be opened or closed by rotation of the driving motor 18 in one or other direction. The circuit of the motor 18 is arranged to be completed at the contacts of a three position relay 19. This relay 19 has a central position in which no contacts are made, a lower position in which contacts 20 and 21 are made, and an upper position in which contacts 22 and 23 are made. The relay 19 has an operating winding 24 and is slow opening and closing, such lag being for example obtained by dash pot means indicated diagrammatically at 25.

Closing of the lower contacts 20 and 21 is arranged to complete a motor circuit over lines 26 and 27 which causes the motor 18 to operate in one direction to open the valve 17, whilst closing of the upper contacts 22 and 23 causes the motor 18 to operate in the other direction to close the valve 17.

The relay coil 24 is energized from the secondary winding 28 of a current transformer responsive to current in the phase bus-bar 5, under the control of contacts 29 of a relay 30. The relay 30 has an operating winding 31 which is energized under the control of the controller 11 when the latter is moved far enough to complete the circuit through line 32 to bus bar 13 so that the contacts 29 are only closed and held closed whilst synchronism exists between the motor 3 and alternator 2. The relay 19 which may, for example, be after the nature of an amperemeter, is, as stated above, a relay having contacts which are respectively closed when upper and lower values of current flow in its coils and to otherwise take an intermediate position in which both contacts are open. In operation when the normal current flow exceeds a predetermined value the contacts 22 and 23 close to effect operation of the auxiliary motor 18 to move the valve 17 towards its closed position. This reduces the steam input and hence tends to limit the speed, voltage and current output of the generator 2. When the current again falls below the predetermined upper value the said contacts 22 and 23 open and the operation of the auxiliary motor 18 is arrested. On the other hand, when the current falls to a predetermined value somewhat lower than the normal current value the contacts 20 and 21 of the relay close whereby operation of the motor 18 is effected to open the valve 17.

The limitation of motive fluid upon the current reaching the predetermined value is effected only after a time delay given by the means 25. In this way operation of the valve when overload currents of a transitory nature occur is avoided.

From the above description it will be understood that the protective gear operates whenever the main current reaches the value at which the relay influenced by the said current is set to operate, whether the rise in current is brought about by operation of the helm, rise of steam pressure, steaming conditions or by a combination of circumstances.

In the arrangements described, it may be possible to replace the current relays with true wattmeter relays.

I claim:—

1. In a propulsion system, a fluid operated prime mover, driving a generator operating a propulsion motor, circuit connections for delivering current from the generator to the motor, a throttle for controlling delivery of operating fluid to the prime mover, a reversible motor for the throttle, a three position switch having contacts controlling circuits for operating said throttle motor to open and close the throttle, an operating coil in a circuit controlled by the flow of current in the generator to motor circuit for operating the three position switch and controlling the flow of fluid to the prime mover and a control relay provided with contacts in the circuit of said operating coil which are arranged to be closed for control of the three position switch by the generator to motor current when the generator and motor are synchronized.

2. A propulsion system as in claim 1 wherein the operating coil of said three position switch under normal current flow in the generator to motor circuit is arranged to maintain the switch in a neutral position but when the current flow exceeds or falls below the normal by a predetermined amount the switch operating coil is energized to move said switch to effect operation of the throttle and adjust delivery of fluid to the prime mover to restore normal current flow between the generator and motor.

3. A propulsion system as in claim 1 wherein said three position switch is movable from a neutral position to one contact closing position or another by fluctuations of the current in the generator to motor circuit and delay means associated with said switch are arranged to delay movement of the switch from neutral to contact closing position so that minor fluctuations in the generator to motor current will not be effective to operate the throttle motor.

4. A propulsion system as in claim 1 wherein the current for energizing the operating coil for operating said three position switch is derived from the secondary of an induction coil in the generator to motor circuit.

5. A propulsion system as in claim 1 wherein the circuit for energizing said operating coil for the three position switch is so arranged that the coil may not be energized until the contacts of said control relay are closed and means is provided for operating the control relay to close its contacts when the generator and motor have been synchronized.

CHARLES WALLACE SAUNDERS.